United States Patent
Schat et al.

(10) Patent No.: US 10,853,485 B2
(45) Date of Patent: Dec. 1, 2020

(54) INTRUSION DETECTION FOR INTEGRATED CIRCUITS

(71) Applicant: NXP B.V., Eindhoven (NL)

(72) Inventors: Jan-Peter Schat, Hamburg (DE); Michael Johannes Döscher, Hamburg (DE)

(73) Assignee: NXP B.V., Eindhoven (NL)

( * ) Notice: Subject to any disclaimer, the term of this patent is extended or adjusted under 35 U.S.C. 154(b) by 414 days.

(21) Appl. No.: 16/004,521

(22) Filed: Jun. 11, 2018

(65) Prior Publication Data

US 2019/0377868 A1    Dec. 12, 2019

(51) Int. Cl.
*G06F 21/55* (2013.01)
*G01R 31/3185* (2006.01)
*G06F 21/76* (2013.01)

(52) U.S. Cl.
CPC ..... *G06F 21/55* (2013.01); *G01R 31/318536* (2013.01); *G06F 21/554* (2013.01); *G06F 21/76* (2013.01); *G06F 2221/034* (2013.01)

(58) Field of Classification Search
CPC .......... G06F 21/76; G06F 21/55; G06F 21/75; G06F 2221/034; G01R 31/318536; G01R 31/8588
USPC .......................................................... 726/23
See application file for complete search history.

(56) References Cited

U.S. PATENT DOCUMENTS

| | | | |
|---|---|---|---|
| 7,428,678 B1 | 9/2008 | Berndt et al. | |
| 7,801,050 B2 | 9/2010 | Mitra | |
| 8,726,112 B2 | 5/2014 | Rajski et al. | |
| 9,165,133 B2 | 10/2015 | La Fever et al. | |
| 2005/0076227 A1 | 4/2005 | Kang et al. | |
| 2017/0237760 A1* | 8/2017 | Holeman | H04L 63/1425 726/22 |
| 2018/0191766 A1* | 7/2018 | Holeman | H04L 63/1441 |

OTHER PUBLICATIONS

Yang et al., "Scan Based Side Channel Attack on Dedicated Hardware Implementations of Data Encryption Standard," ITC International Test Conference, IEEE (2004).

(Continued)

*Primary Examiner* — Kambiz Zand
*Assistant Examiner* — Benjamin A Kaplan
(74) *Attorney, Agent, or Firm* — Rajeev Madnawat

(57) ABSTRACT

Certain aspects of the disclosure are directed to methods and apparatuses of intrusion detection for integrated circuits. An example apparatus can include a wired communications bus configured and arranged to carry data and a plurality of integrated circuits. The plurality of integrated circuits can include a first integrated circuit configured and arranged to operate in a scan mode during which the first integrated circuit performs a scan test to detect one or more faults in circuitry of the plurality of integrated circuits. The plurality of integrated circuits can further include a second integrated circuit configured and arranged to operate in a mission mode and supervise data traffic by monitoring communications including data patterns and accesses on the wired communications bus. In response to identifying a suspected illegitimate access, the second integrated circuit can perform a security action to mitigate a suspect illegitimate action in the plurality of integrated circuits.

20 Claims, 3 Drawing Sheets

(56) References Cited

OTHER PUBLICATIONS

Ali et al., "New Scan Attacks Against State-of-the-art Countermeasures and DFT," IEEE (2014).
Cui et al., "Static and Dynamic Obfuscations of Scan Data Against Scan-Based Side-Channel Attacks," IEEE Transactions on Information Forensics and Security, vol. 12, No. 2 (Feb. 2017).
IEEE Standard for HIgh-Speed Test Access Port and On-Chip Distribution Architecture, IEEE Computer Society, IEEE Std 1149.10TM-2017.
"This Car Runs on Code", IEEE Spectrum, Green Tech, 6 pgs. Retrieved from the internet Oct. 5, 2020 at: http://www.real-programmer.com/interesting_things/IEEE%20SpectrumThisCarRunsOnCode.pdf (Feb. 28, 2010).

* cited by examiner

INTRUSION DETECTION FOR INTEGRATED CIRCUITS

OVERVIEW

Aspects of various embodiments are directed to intrusion detection for integrated circuits. Electronic devices have become a part of everyday life. Examples of electronic devices include integrated circuits, cellular telephones, smartphones, wireless modems, computers, digital music players, Global Positioning System (GPS) units, Personal Digital Assistants, gaming devices, etc. Electronic devices are now placed in everything from automobiles to housing locks. The complexity of electronic devices has increased dramatically in the last few years. For example, many electronic devices have one or more processors that help control the device, as well as a number of digital circuits to support the processor and other parts of the device. This increased complexity has led to an increased need for testing that can test integrated circuits and/or digital systems. Testing may be used to verify or test various parts of devices, such as pieces of hardware, software or a combination of both.

Scannable integrated circuits generally comprise of one or more scan chains for applying known stimulus (i.e., test) data to the functional circuitry of the integrated circuit and observing data that results from one or more subsequent normal operating cycles. The scan chains may be useful for initializing the integrated circuit. While some scan tests increase the controllability and observability of the Design Under Test (DUT), when implemented, they may provide opportunities for an attacker to illegitimately access the integrated circuits. For instance, an attacker can retrieve the intermediate results of cryptographic hardware by running the device in normal mode and then by switching to test mode before the complete execution of the algorithm. In test mode the intermediate results, which are stored in scan chains, are shifted out through the scan out (SO) pin. Once the intermediate results are obtained, a differential analysis technique can be applied to retrieve the secret key of the cipher, thereby granting the attacker access to the integrated circuits.

It may be beneficial, however, to perform a scan test of integrated circuits in the field (e.g., after manufacturing). For instance, in cases where the embedded logic built-in self-test (BIST) does not provide sufficient test coverage, a deterministic scan test during the integrated circuit (IC) lifetime may be beneficial. In this case, a communications bus of the IC might put the IC under test into scan test mode, perform a scan test and put it back into operational mode. This could also be the case after repair and maintenance cycles, software updates (by direct access or over-the-air) among others.

SUMMARY

Various example embodiments are directed to intrusion detection mechanisms for integrated circuits. In certain example embodiments, aspects of the present disclosure involve a system and apparatus for intrusion detection implemented in an integrated circuit (IC). The system can supervise data stream communicated over the wired communications bus coupling the ICs, and check the scan packets. The system can then detect an illegitimate data communication, and in response, perform a security action to mitigate the impact of the illegitimate data communication in the ICs.

In a more specific example embodiment, aspects of the present disclosure are directed toward an apparatus including a wired communications bus configured and arranged to carry data and a plurality of integrated circuits, each configured and arranged to interface with the wired communications bus. According to such example embodiments, the plurality of integrated circuits can include a first integrated circuit configured and arranged to operate in a scan mode during which the first integrated circuit performs a scan test to detect one or more faults in circuitry of the plurality of integrated circuits. The plurality of integrated circuits can further include a second integrated circuit configured and arranged to operate in a mission mode during which the second integrated circuit supervises data traffic by monitoring communications including data patterns and accesses on the wired communications bus, detecting a suspect illegitimate data communication, and in response, performing a security action to mitigate a suspect illegitimate action in the plurality of integrated circuits.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
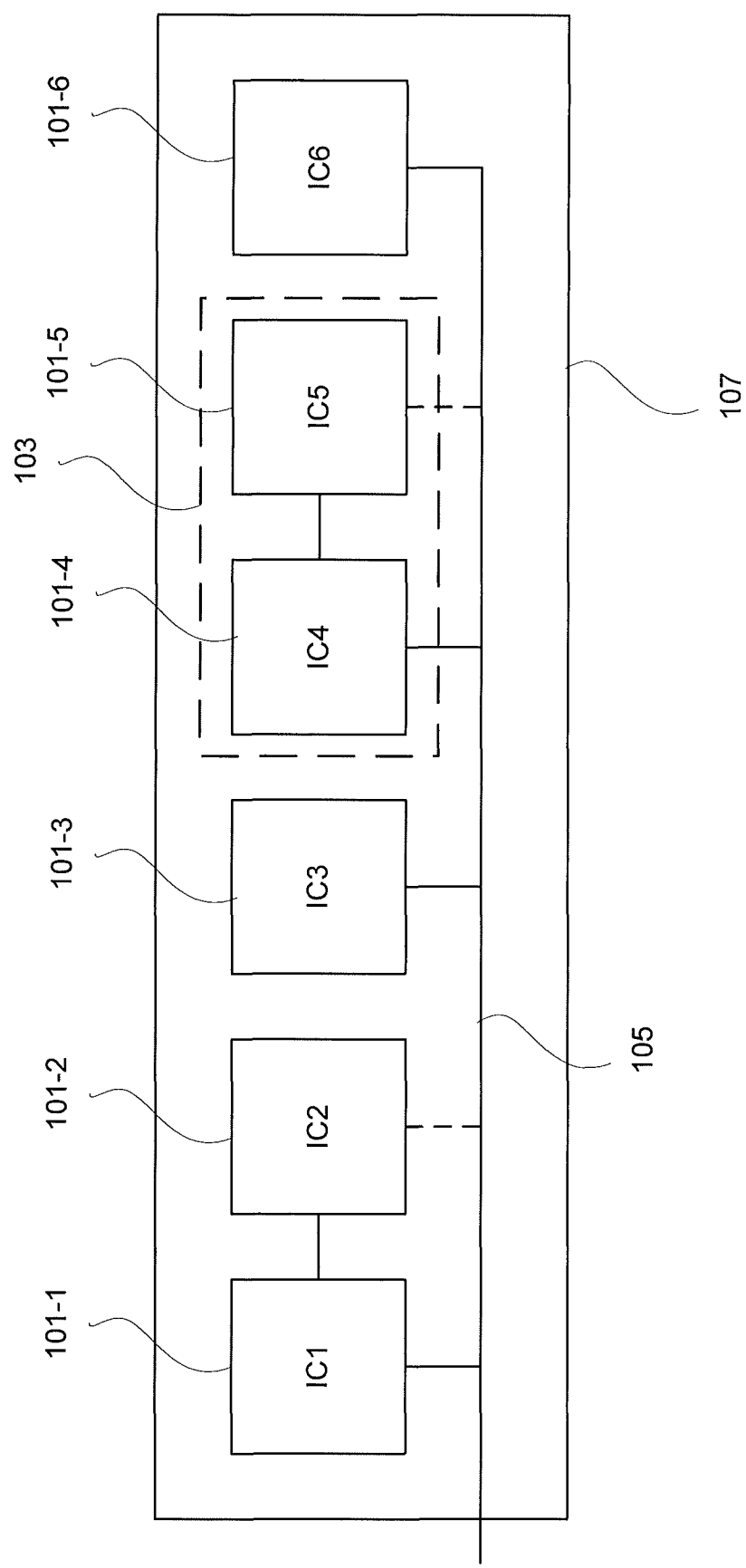
FIG. 1 illustrates an apparatus for intrusion detection among a plurality of integrated circuits, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving to intrusion detection for integrated circuits. In certain implementations, aspects of the present disclosure have been shown to be beneficial when used in the context of differentiating between illegitimate scan tests (e.g., scan tests which provide unauthorized access to the integrated circuits) and legitimate scan tests (e.g., scan tests which provide authorized access to the integrated circuits) of communications bus traffic. In some embodiments, aspects of the present disclosure include a system and method whereby a particular IC (e.g., a "watchdog") coupled to a High-Speed Input/Output (HSIO) communications bus can monitor the data traffic over the communications bus. The particular IC can distinguish legitimate scan tests from illegitimate scan tests on the communications bus, and perform selected actions to mitigate the impact of suspected illegitimate scan tests. While not necessarily so limited, various aspects may be appreciated through the following discussion of non-limiting examples which use exemplary contexts.

Integrated circuits (ICs) designed with testability in mind may include provisions for scan testing. A scan test involves loading input scan data into one or more scan chains (also referred to as a "scan shift register"), using the input scan data to test logic in the device-under-test (DUT), loading the scan chain with output scan data from the logic of the DUT, reading out the output scan data from the scan chain, and analyzing the output scan data to determine whether the DUT has passed or failed the test. In contrast to so called "boundary-scan-testing," scan tests allow for testing of logic deep in the DUT, rather than just the boundaries of the DUT.

A scan chain may comprise multiple, serially connected flip-flops and/or latches. A scan chain may use a scan clock to time the shifting of scan data from one flip-flop to another. Input scan data may be serially loaded into the scan chain and then unloaded in parallel for testing a logic circuit. Data from the logic circuit being tested may be loaded in parallel to the scan chain and then read out as output scan data for analysis. A scan architecture may also employ multiple scan chains.

High-speed serial interfaces may be utilized in integrated circuits to perform scan tests. Because these high-speed serial interfaces are also used during normal operation, they typically comply with industry standards, are relatively fast, and do not constitute additional overhead for testing.

Scan chain attacks refer to or include non-invasive side-channel attacks, where the sensitive data being stored, generated, transferred or processed when a chip is active can be stolen without the need to remove the chip packaging to probe into its internals. Side-channel parameters, such as electromagnetic field radiation, power consumption, timing analysis and deliberately induced faults can be measured externally to infer the chip's internal activities and sensitive information processed by the chip. With the help of side-channels, these attacks do not require expensive equipment and can have a high rate of success, even if the cryptographic core is deeply embedded in a complex system. As the attacked chip remains operable normally in the system even if the secret has been successfully stolen, more losses and damages can be made than the invasive attacks due to the extended use of a compromised crypto chip in the system until it is discovered. Scan chain attacks may appear as legitimate scan tests, thereby making it difficult to distinguish between legitimate and illegitimate attempts to access the associated circuitry.

Although some scan tests provide opportunities for an attacker to illegitimately access integrated circuits, it may be beneficial to perform a scan test of integrated circuits in the field after manufacturing. Such integrated circuits generally operate in two modes of operation, mission mode and test mode. During mission mode, the integrated circuit acts in its end-user operation mode. In mission mode, the normal data inputs come from other logic within the design and the normal data outputs are applied. During test mode, test data inputs are applied. Generally, the test mode is implemented prior to customer use to ensure proper functionality of the integrated circuit, but there may be instances in which testing of an integrated circuit may be beneficial in the field (e.g., after the IC has left the manufacturing facility). For instance, in cases where the embedded logic BIST does not provide sufficient test coverage, a deterministic scan test during lifetime may be beneficial. Accordingly, it may be beneficial to differentiate between illegitimate scan tests (e.g., scan tests which provide unauthorized access to the integrated circuits) and legitimate scan tests (e.g., scan tests which provide authorized access to the integrated circuits).

The IEEE 1149.10 standard describes an access method for performing a scan test via a High-Speed Input/Output (HSIO) interface like an Ethernet, universal serial bus (USB), and/or mobile industry processing interface (MIPI) (CSI-2). This HSIO interface is convenient for production scan tests, may also be beneficial for scan tests implemented in the field. For instance, scan testing in the field may be beneficial in situations where the scan test coverage of embedded logic BIST (LBIST) is too low. This is often the case, as LBIST hardly reaches a coverage above 90%, which is much lower than the coverage for deterministic scan tests, and which is much lower than some industry standards (e.g., ISO 26262 which indicates coverage between 90-99%).

Today's cars have several hundred ICs for various functions, often connected by an in-vehicle network, such as a communications bus. In the near future, some vehicles may be equipped with HSIO interfaces and with industry standard scan access ports. These scan access ports may be used for delivery of test data, a packet format for describing the test payload, and a distribution architecture for converting the test data to/from on-chip test structures. Such industry standard is exemplified by IEEE 1149.10, though example embodiments of the present invention are not limited to systems which conform to this standard. With increasing IC penetration into the automotive market, such as with autonomous vehicles for example, there exists an increasing number of potential entry ports into the in-vehicle-network. Additionally, vehicles may include a plurality of ICs which are provided from many different suppliers, making it increasingly difficult to control the number of entry ports into the in-vehicle network.

The convenience of fast and easy access to scan tests increases the risk of attackers misusing the scan test to illegitimately access the ICs. For example, an attacker could use a scan test to simply put an IC out of function. As another illustration, an attacker could use a scan test to disturb any function controlled by the IC, such as in vehicle electronics as with the above discussed example embodiment. Moreover, an attacker could use a scan test to read out internal data of the IC, in order to enable attacks to other ICs or functions, to use the data for other purposes, to implement various forms of ransomware, to obtain motion profiles from vehicle users, and/or to access an event data recorder after an accident, in order to read out, destroy, and/or modify data.

It may be beneficial, however, to perform a legitimate scan test of ICs in the field (e.g., after manufacturing). For instance, in cases where the embedded LBIST does not provide sufficient test coverage, a deterministic scan test during lifetime may be beneficial. In this case, a communications bus of the IC might put the IC under test into scan test mode, perform a scan test and put it back into operational mode. This could also be the case after repair and maintenance cycles, software updates (by direct access or over-the-air) etc. As such, it may not be desirable to detect and prevent any scan access during mission mode, but rather to detect and prevent malicious scan access during mission mode.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with example embodiments, an apparatus is configured and arranged to implement an intrusion detection mechanism for a plurality of integrated circuits. The apparatus includes a wired communications bus configured and arranged to carry data, and a plurality of integrated circuits, each configured and arranged to interface with the wired communications bus. The plurality of integrated circuits include a first integrated circuit configured and arranged to operate in a scan mode during which the first integrated circuit performs a scan test to detect one or more faults in circuitry of the plurality of integrated circuits. The first integrated circuit may be configured and arranged to perform a legitimate scan test during the scan mode and not during mission mode. The plurality of integrated circuits further include a second integrated circuit configured and arranged to operate in a mission mode during which the second integrated circuit supervises data traffic by monitoring communications including data patterns and accesses on the wired communications bus, detecting a suspect illegitimate data communication, and in response, performing a security action to mitigate a suspect illegitimate action in the plurality of integrated circuits.

In example embodiments, the first integrated circuit and the second integrated circuit respectively correspond to two separate chipsets, each being connected to the wired communications bus and each configured and arranged to operate independent of the other of the separate chipset. Additionally, the second integrated circuit can correspond to two separate chipsets, each being connected to the wired communications bus and each configured and arranged both to operate independent of the other of the separate chipset and to operate cooperatively and independent of the wired communications bus. For instance, the second integrated circuit can correspond to two separate chipsets. One of the chipsets can include a supervisory (e.g., "watchdog") chipset, and the other chipset can include an action-responsive (e.g., "attack mitigation") chipset. The two separate chipsets comprising the second integrated circuit can each be connected to the wired communications bus and each can be configured and arranged both to operate independent of the other of the separate chipset and to operate cooperatively and independent of the wired communications bus. As an illustration, the supervisory chipset can be configured and arranged to supervise data traffic by monitoring data patterns on the wired communications bus for detecting a suspect illegitimate action, and the action-responsive chipset can be configured and arranged to respond to a communication from the supervisory chipset by performing a security action to mitigate the suspect illegitimate action.

In various example embodiments, the second integrated circuit can be configured and arranged to supervise data traffic by monitoring data patterns on the wired communications bus. For instance, the second integrated circuit, via a supervisory circuit, can be configured and arranged to supervise data traffic by monitoring data patterns on the wired communications bus for detecting a suspect illegitimate action. The second integrated circuit can also include an action-responsive circuit configured and arranged to respond to a communication from the supervisory circuit by performing a security action to mitigate the suspect illegitimate action and therein lessen risk ensuing from a malicious access.

In some example embodiments, the circuitry of the integrated circuits includes scan chain circuitry, and wherein the second integrated circuit is further configured and arranged to operate in a mission mode by detecting, via the wired communications bus, one or more special data patterns for legitimately testing aspects of the scan chain circuitry. For instance, setting the IC into test mode may be done using a compliance character specific for each IC type. Once in test mode, the internal packet encoding/decoding and distribution architecture (PEDDA) logic of the IC takes control over the internal circuit, loads the scan chains, performs a scan capture cycle, and outputs the contents of the scan chains via a port (such as the HSIO port discussed above) to the communications bus. A scan packet sent to the IC according to IEEE 1149.10 may include several pieces of control data, and the "payload", i.e., the scan test patterns. For instance, the scan packet may include start-of-package (SOP) data, which refers to or includes a standardized character (0xFB) with which all packets start. The scan packet may further include a scan byte, which refers to or includes a standardized character (0x06) which is the second character of scan packets. Next, an identification (ID) byte may be included, which is specific to the scan packet sent. Additional control data include instruction, capture, shift, update (ICSU) bits, a cycle-count, checksum bits, and end-of-packet (EOP) bits. The cycle count refers to or includes a number to specify the scan test cycle of the scan test data. Additionally, the payload refers to or includes the scan patterns to be applied to the IC. The second integrated circuit may operate in a mission mode by detecting, via the wired communications bus, one or more scan patterns in the payload of the scan packet, which are associated with illegitimate versus legitimately scan tests.

In yet further example embodiments, the plurality of integrated circuits includes analog-to-digital conversion (ADC) circuitry and scan chain circuitry. In such example embodiments, the second integrated circuit is configured and arranged to operate in the mission mode by detecting one or more special data patterns transferred from ADC circuitry for legitimately testing aspects of the scan chain circuitry. For instance, the second integrated circuit may detect a legitimate access mode for testing the ADC that includes transferring the ADC's response into scan flip-flops and shifting out their contents. Such data patterns may typically be identified as untypical, suspicions patterns for in-situ testing, but may under certain circumstances be identified by the second integrated circuit as a legitimate scan test of the scan chain circuitry.

Additionally and/or alternatively, the plurality of integrated circuits may include digital-to-analog conversion (DAC) circuitry and scan chain circuitry. In such example embodiments, the second integrated circuit is configured and arranged to operate in the mission mode by detecting one or more special data patterns transferred into DAC circuitry for legitimately testing aspects of the scan chain circuitry. For instance, the second integrated circuit may detect a legitimate access mode for testing the DAC that includes a shift in the intended DAC input data into a scan chain and transferring these input data from the scan chain flip-flops to the DAC. Again, such data patterns may typically be identified as untypical, suspicions patterns for in-situ testing, but may under certain circumstances be identified by the second integrated circuit as a legitimate scan test of the scan chain circuitry.

In various example embodiments, the apparatus includes a memory circuit configured and arranged to be accessed by the second integrated circuit and to store certain data patterns which are known to be associated with or correspond to illegitimate accesses. Additionally and/or alternatively, the second integrated circuit or another of the plurality of integrated circuits can be configured and arranged to self-learn the certain data patterns that correspond to illegitimate accesses in response to detected data patterns for which the second integrated circuit performs a security action to mitigate the suspect illegitimate action.

For instance, the second integrated circuit may be configured and arranged to identify patterns of scan read/write access which are untypical for a standard scan test, but typical for attempts to get illegitimate access to the ICs and obtain protected information. As an illustration, the second integrated circuit can be configured and arranged to operate in the mission mode by detecting an illegitimately access to the plurality of integrated circuits by multiple write-type accesses to a common location of circuitry of the same data pattern followed by a read-type access. Multiple write access of the same pattern to the same location followed by read access is typical for an attack to check if any obfuscating behavior of the scan mechanism is present. Such obfuscating behavior may modify the scan response in a deterministic, pseudo-random way which is only decodable by a legitimate reader, thus the response from each scan pattern to the next is different, even if the same scan pattern has been written.

Another data pattern identified by the second integrated circuit as illegitimate may include multiple write-type accesses to a common location of circuitry of similar data patterns, which are the same except by a difference of one bit, followed by a read-type access. Multiple write accesses to a certain portion of the scan chain (e.g., 8, 16 or 32 bits) (followed by read access) with one bit difference from each write access to the next, may also be to illegitimately access the ICs.

Additionally and/or alternatively, the second integrated circuit can be configured and arranged to operate in the mission mode by detecting an illegitimately access to the plurality of integrated circuits by multiple write-type accesses to a common location of circuitry of data patterns which correspond to counting of bits of a certain portion of the scan chain circuitry, followed by a read-type access. Multiple write accesses to the same location, counting the bits of a certain portion of the scan chain (e.g., 8, 16 or 32 bits) upwards or downwards, followed by read access, is a scheme that may be employed for a brute-force attack on a crypto engine.

In yet further examples, the second integrated circuit can be configured and arranged to operate in the mission mode by detecting an illegitimately access to the plurality of integrated circuits by multiple read-type accesses to a common location of circuitry. Multiple read access from the same location, without preceding write access, is a scheme that may be employed in a laser attack (e.g., in a situation where flip-flop contents are modified).

Additional types of illegitimate accesses may also be detected by the second integrated circuit. For instance, the second integrated circuit can be configured and arranged to operate in the mission mode by detecting an illegitimately access to the plurality of integrated circuits by multiple write-type accesses to a common location of circuitry followed by more than two capture cycles in a read-type access. A write access followed by more than two capture cycles and a read access may be indicative of a test-mode only attack. Similarly, the second integrated circuit can be configured and arranged to operate in the mission mode by detecting an illegitimately access to the plurality of integrated circuits by a write-type access to the scan chain circuitry causing a constant bit of a common polarity to be shifted into the scan chain circuitry. A write access with a constant 0 (or 1) shifted in may be indicative of an attempt to break an advanced encryption standard (AES) cryptographic engine.

In various example embodiments, the second integrated circuit can include circuitry configured and arranged to respond to a suspected illegitimate access by performing a security action to mitigate the suspect illegitimate action and therein lessen risk ensuing from a malicious access. For instance, the second integrated circuit can include an action-responsive circuit which performs a security action, including shutting down operation of the mission mode (e.g., system shutdown in a controlled manner). Examples are not so limited, however, and additional and/or alternative security actions may be performed. In some example embodiments, the security action corresponds to reverting to another previously-authorized secure system mode of operation which includes a subset, corresponding to less than all, of operational aspects enabled during the mission mode (e.g., fallback into a pre-defined secure system mode). In additional example embodiments, the security action corresponds to disabling certain aspects of the plurality of integrated circuits.

Additionally and/or alternatively, the security action can correspond to acceptance of compliance by the user, as may be the case when a new system component is inserted and the system needs to learn that this is an accepted addition to the network. As such, the plurality of integrated circuits can be configured and arranged to operate in a controlled circuit-modification mode. In such circuit-modification mode, the second integrated circuit or another of the plurality of integrated circuits can be configured and arranged to self-learn the certain data patterns by modifying the certain data patterns in response to user-provided instructions indicating acceptance or compliance. In such embodiments, the circuit-modification mode includes a self-learning functionality in which legitimate access in the network can be taught to the system, for instance, as part of the outgoing system functionality check in an automotive manufacturing line or in an initial phase of usage under sufficiently controlled conditions.

Turning now to the figures, FIG. 1 illustrates an apparatus 107 for intrusion detection in accordance with the present disclosure. In some example embodiments, apparatus 107 can comprise and/or be included in an advanced driver-assistance system (ADAS). As illustrated in FIG. 1, the apparatus 107 includes a wired communications bus 105 configured and arranged to carry data, and a plurality of integrated circuits 101-1, 101-2, 101-3, 101-4, 101-5, and 101-6 (collectively referred to herein as "integrated circuits 101"), each configured and arranged to interface with the wired communications bus 105. In some example embodiments, the wired communications bus 105 may be a (HSIO) communications bus. The integrated circuits 101 may be independent integrated circuits (as illustrated) or blocks in one integrated circuit or any combination thereof. For instance, as illustrated in FIG. 1, integrated circuits 101-4 and 101-5 may comprise two separate blocks on a same integrated circuit 103. In some example embodiments, each of the integrated circuits 101 may include HSIO ports according to an industry standard, as discussed herein.

In example embodiments, integrated circuit 101-1 may be vulnerable to illegitimate accesses, as discussed herein. As illustrated in FIG. 1, integrated circuit 101-1 has a connection to integrated circuit 101-2. Integrated circuit 101-1 may be considered one victim of a potential attack. Integrated circuit 101-2 is an integrated circuit of which corruption may cause a malfunction of apparatus 107. Integrated circuit 101-2 can be connected to integrated circuit 101-1, and in an attack scenario, the compromised integrated circuit 101-1 might disturb the function of integrated circuit 101-2. Additionally and/or alternatively, integrated circuit 101-2 is not connected to the wired communications bus 105. Integrated circuit 101-2 is thus considered another victim in a potential attack.

As illustrated in FIG. 1, integrated circuit 101-3 can be an integrated circuit connected to the communications bus 105. In a hypothetical scenario, integrated circuit 101-3 may be compromised. For instance, integrated circuit 101-3 may have been altered by an attacker during a compromised software update, during over-the-air software updates, exchanged by a malicious car repair garage during maintenance, attacked via insufficiently secured communication channels, and/or altered during ad-hoc network operations. In such a manner, integrated circuit 101-3 may be considered to be the integrated circuit of apparatus 107 that performs the attack on the remaining of the integrated circuits 101. While integrated circuit 101-3 is used as an illustration of a compromised integrated circuit that performs an attack on apparatus 107, examples are not so limited.

In various embodiments, the integrated circuits 101 include a first integrated circuit configured and arranged to operate in a scan mode during which the first integrated circuit performs a scan test to detect one or more faults in circuitry of the plurality of integrated circuits 101. For instance, integrated circuit 101-6 may perform a legitimate scan test, e.g. during start-up, before power down or in intervals not including mission mode. In some embodiments, integrated circuit 101-6 may perform a scan test when integrated circuit 101-1 is not needed. During scan mode, integrated circuit 101-6 may put integrated circuit 101-1 into scan test mode, perform a scan test and put integrated circuit 101-1 back into mission mode. As such, the first integrated circuit may be configured and arranged to perform a legitimate scan test during the scan mode and not during mission mode. In case the scan test fails, appropriate action may be taken, as discussed further herein. While the illustration above uses integrated circuit 101-6 as an example of the first integrated circuit which performs the scan test, others of the integrated circuits 101 may instead perform the scan test described.

The apparatus 107 may also include a second integrated circuit configured and arranged to operate in a mission mode during which the second integrated circuit supervises data traffic by monitoring communications including data patterns and accesses on the wired communications bus 105. The second integrated circuit may detect a suspect illegitimate data communication, and in response, perform a security action to mitigate a suspect illegitimate action in the plurality of integrated circuits 101. For instance, integrated circuit 101-4 may supervise the data traffic on the wired communications bus 105 and report a suspected attack. The supervision or "watchdog" functionality of integrated circuit 101-4 can be a main or additional functionality of integrated circuit 101-4. In some example embodiments, the first integrated circuit (e.g., integrated circuit 101-6 in the above illustration) and the second integrated circuit (e.g., integrated circuit 101-4 in the above illustration) respectively correspond to two separate chipsets, each being connected to the wired communications bus 105 and each configured and arranged to operate independent of the other of the separate chipset.

As discussed herein, one of the integrated circuits 101 can be configured and arranged to respond to a suspected illegitimate attack by performing a security action to mitigate the suspect illegitimate action and therein lessen risk ensuing from a malicious access. For instance, integrated circuit 101-5 may perform an appropriate action in case an attack is suspected, as instructed by integrated circuit 101-4. Integrated circuit 101-5 may or may not be connected to the wired communications bus 105. Moreover, integrated circuit 101-5 may, in some example embodiments, perform additional functionality aside from performing a security action to mitigate the suspect illegitimate action.

In various example embodiments, integrated circuit 101-4 (or 103, as the case may be) can be configured and arranged to identify scan patterns which are untypical for a standard scan test, but typical for attempts to get illegitimate access to the ICs 101 and obtain protected information. As such, integrated circuit 101-4 may supervise the data stream over the wired communications bus 105, and check the scan packets sent. Data that contains scan test patterns corresponding with known attack modes are identified and flagged. For instance, identification by integrated circuit 101-4 of a suspected illegitimate access can result in generation of an error code. This error code can trigger actions, which may or may not be implemented by integrated circuit 101-5, including system shutdown, fallback into a predefined secure system mode, disabling of parts of the system, and acceptance of compliance by the user (e.g. in case a new system component is inserted and the system need to learn that this is an accepted addition to the network).

In some embodiments, the integrated circuit 101-4 or another of the plurality of integrated circuits 101 can be configured and arranged to self-learn the certain data patterns that correspond to illegitimate accesses in response to detected data patterns. This can be done as part of the outgoing system functionality check or in an initial phase of usage under sufficiently controlled conditions. In some embodiments, these patterns can be stored in an on-board memory to allow system flexibility and agility.

Figure 2:
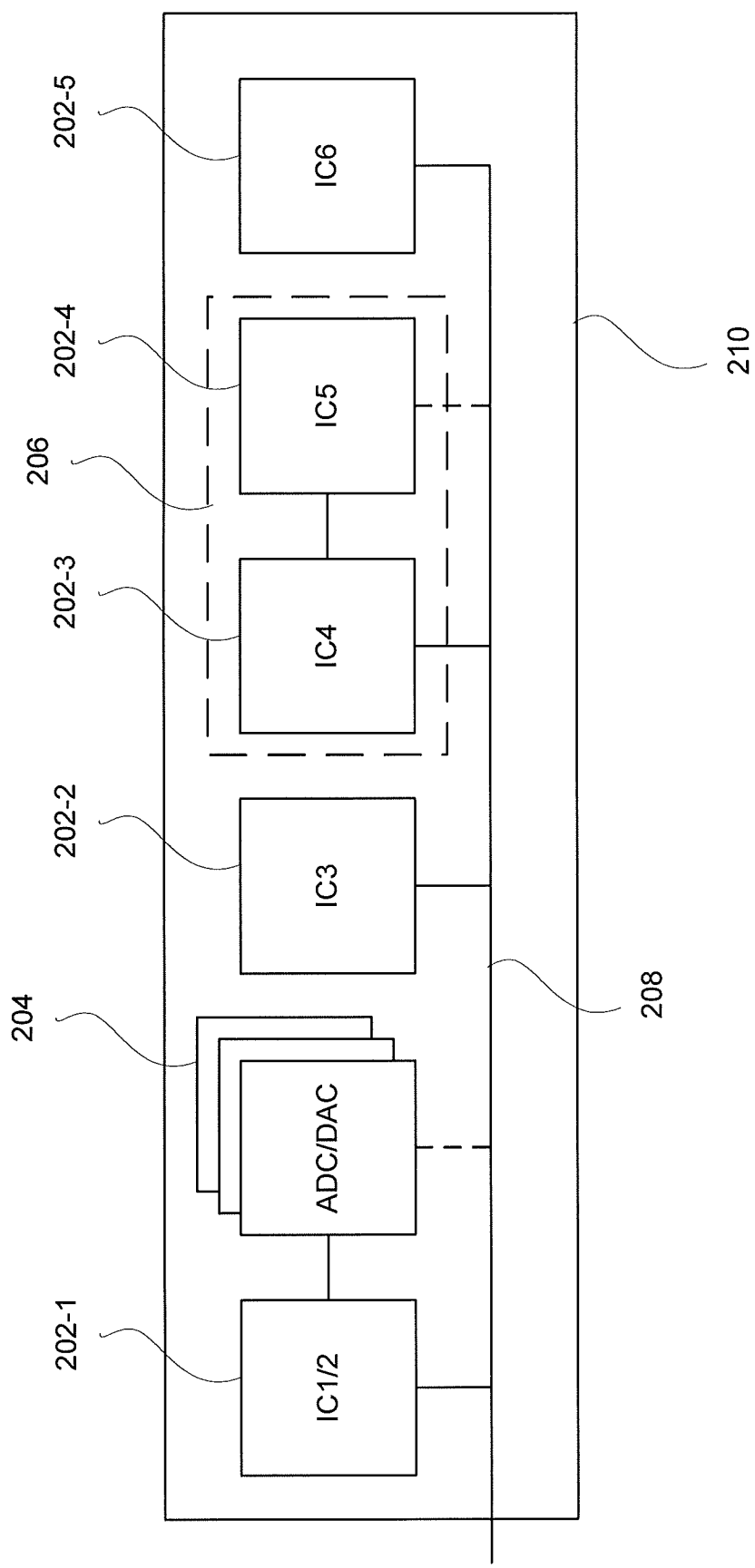
FIG. 2 further illustrates an apparatus for intrusion detection among a plurality of integrated circuits, in accordance with the present disclosure.

FIG. 2 further illustrates an apparatus 210 for intrusion detection among a plurality of integrated circuits, in accordance with the present disclosure. In the example embodiment illustrated in FIG. 2, the plurality of integrated circuits 202-1, 204, 202-2, 202-3, 202-4, 202-5, 206, include analog-to-digital conversion (ADC) circuitry 204 and scan chain circuitry. Integrated circuits 202-1, 202-2, 202-3, 202-4, 202-5, and 206, in some example embodiments, correspond with integrated circuits 101-1, 101-3, 101-4, 101-5, 101-6, and 103, respectively. Similarly, communications bus 208, in some example embodiments, corresponds with communications bus 105. In such example embodiments, the integrated circuit 202-3 (or 206, as the case may be) can be configured and arranged to operate in the mission mode by detecting one or more special data patterns transferred from ADC circuitry 204 for legitimately testing aspects of the scan chain circuitry. For instance, integrated circuit 202-3 (or 206) may detect a legitimate access mode for testing the ADC 204 that includes transferring the ADC's response into scan flip-flops and shifting out their contents. Such data patterns may typically be identified as untypical, suspicions patterns for in-situ testing, but may under certain circumstances be identified by the second integrated circuit as a legitimate scan test of the scan chain circuitry.

Additionally and/or alternatively, the plurality of integrated circuits may include digital-to-analog conversion (DAC) circuitry 204 and scan chain circuitry. In such example embodiments, the integrated circuit 202-3 (or 206) can be configured and arranged to operate in the mission mode by detecting one or more special data patterns transferred into DAC circuitry 204 for legitimately testing aspects of the scan chain circuitry. For instance, integrated circuit 202-3 (or 206) may detect a legitimate access mode for testing the DAC 204 that includes a shift in the intended DAC input data into a scan chain and transferring these input data from the scan chain flip-flops to the DAC. Again, such data patterns may typically be identified as untypical, suspicions patterns for in-situ testing, but may under certain circumstances be identified by integrated circuit 202-3 as a legitimate scan test of the scan chain circuitry.

Figure 3:
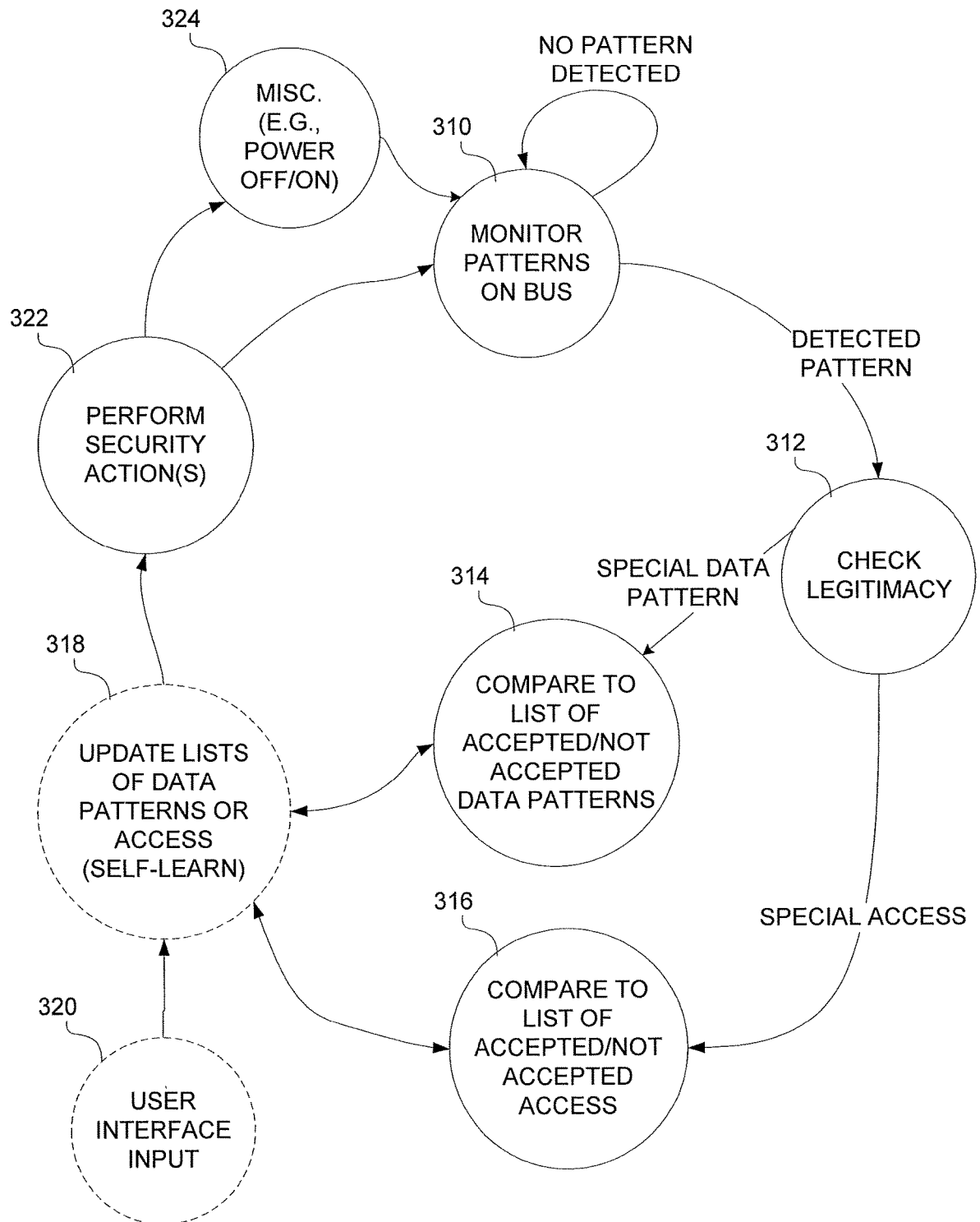
FIG. 3 is a flow chart illustrating an exemplary set of activities and/or data flow for a system of the type implemented in a manner consistent with FIG. 1, in accordance with the present disclosure.

FIG. 3 is a flow chart illustrating an exemplary set of activities and/or data flow for a system of the type implemented in a manner consistent with FIG. 1, in accordance with the present disclosure. Particularly, FIG. 3 illustrates a method for intrusion detection among a plurality of integrated circuits in accordance with the present disclosure. The method may begin at step 310, with monitoring patterns on a communications bus. As described with regards to FIGS. 1 and 2, a wired communications bus can be configured and arranged to carry data, and a plurality of integrated circuits can each be configured and arranged to interface with the wired communications bus. In some example embodiments the wired communications bus is a HSIO interface, and the plurality of integrated circuits include industry standard scan access ports compatible with the HSIO interface.

One of the integrated circuits coupled to the wired communications can monitor communications including data patterns and accesses on the wired communications bus. For instance, during mission mode, a particular integrated circuit can supervise data traffic by monitoring communications including data patterns and accesses on the wired communications bus. If no pattern or access is detected, the method continues with step 310 with monitoring patterns on the communications bus.

If a pattern or data access is detected by the integrated circuit, the method continues to step 312 with checking (via the particular integrated circuit) the legitimacy of the detected pattern or access. For instance, at 314, the method includes comparing (via the particular integrated circuit) the detected pattern to a list of accepted and/or not-accepted data patterns. For instance, integrated circuit 202-3 illustrated in FIG. 2 can detect a legitimate access mode for testing the ADC that includes transferring the ADC's response into scan flip-flops and shifting out their contents.

Additionally and/or alternatively, at 316, the method includes comparing (via the particular integrated circuit) the detected data access to a list of accepted or not-accepted data accesses. For instance, the particular integrated circuit (e.g., 101-4 illustrated in FIGS. 1 and 202-3 illustrated in FIG. 2) can be configured and arranged to identify patterns of scan read/write access which are untypical for a standard scan test, but typical for attempts to get illegitimate access to the ICs and obtain protected information.

At 322, the method includes performing security actions. For instance, an action-responsive circuit (such as 101-5 illustrated in FIGS. 1 and 202-4 illustrated in FIG. 2) can be configured and arranged to respond to a communication from a supervisory circuit (such as 101-4 illustrated in FIGS. 1 and 202-3 illustrated in FIG. 2) by performing a security action to mitigate the suspect illegitimate action and therein lessen risk ensuing from a malicious access.

At step 324, the method includes implementation of the security actions from step 322 by the system at large. For instance, the system itself (e.g., apparatus 107) may shut down operation of the mission mode (e.g., system shutdown in a controlled manner). Additionally and/or alternatively, the security action corresponds to reverting to another previously-authorized secure system mode of operation which includes a subset, corresponding to less than all, of operational aspects enabled during the mission mode (e.g., fallback into a pre-defined secure system mode). In additional example embodiments, the security action corresponds to disabling certain aspects of the plurality of integrated circuits, as discussed herein.

At 318, the method can optionally include updating lists of data patterns or accesses. For instance the plurality of integrated circuits can be configured and arranged to operate in a controlled circuit-modification mode. In such circuit-modification mode, the particular integrated circuit or another of the plurality of integrated circuits can be configured and arranged to self-learn the certain data patterns by modifying the certain data patterns in response to user-provided instructions indicating acceptance or compliance. As such, the method may optionally include, at 320, user interface input indicating acceptance of compliance by a user, as may be the case when a new system component is inserted and the system needs to learn that this is an accepted addition to the network.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, device, system, and/or other circuit-type depictions (e.g., reference numerals 101-1, 101-2, 101-3, 101-4, 101-5, 101-6, and 103 of FIG. 1 and reference numerals 202-1, 202-2, 202-3, 202-4, 202-5, 204, and 206 of FIG. 2 depict a block as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1, 2, and 3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described and illustrated with regards to FIG. 3 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first integrated circuit," a "second integrated circuit," etc., where the integrated circuit might be replaced with terms such as "circuitry" and others, the adjectives "first" and "second" are not used to connote any description of the structure or to provide any substantive meaning; rather, such adjectives are merely used for English-language antecedence to differentiate one such similarly-named structure from another similarly-named structure (e.g., "second integrated circuit configured and arranged to operate . . . " is interpreted as "circuitry configured and arranged to operate . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, steps 318 and 320 illustrated and discussed with regards to FIG. 3 may be skipped entirely. As another example, the method may include step 314 and not step 316, or include step 316 and not step 314. Such modifications do not depart from the true spirit and scope of various aspects of the disclosure, including aspects set forth in the claims.

What is claimed is:

1. An apparatus comprising:
    a wired communications bus configured and arranged to carry data; and
    a plurality of integrated circuits, each configured and arranged to interface with the wired communications bus, the plurality of integrated circuits including:
        a first integrated circuit configured and arranged to operate in a scan mode during which the first integrated circuit performs a scan test to detect one or more faults in circuitry of the plurality of integrated circuits; and
        a second integrated circuit configured and arranged to operate in a mission mode during which the second integrated circuit supervises data traffic by monitoring communications including data patterns and accesses on the wired communications bus, detecting a suspect illegitimate data communication, and in response, performing a security action to mitigate a suspect illegitimate action in the plurality of integrated circuits, wherein the second integrated circuit corresponds to two separate circuits including a supervisory circuit and an action-responsive circuit, wherein the supervisory circuit is configured and arranged to supervise data traffic by monitoring data patterns on the wired communications bus for detecting a suspect illegitimate scan test action and the action-responsive circuit is configured and arranged to respond to a communication from the supervisory circuit by performing a security action to mitigate the suspect illegitimate action.

2. The apparatus of claim 1, wherein the first integrated circuit is further configured and arranged to perform a legitimate scan test during the scan mode and not during mission mode.

3. The apparatus of claim 1, wherein the first integrated circuit and the second integrated circuit respectively correspond to two separate chipsets, each being connected to the wired communications bus and each configured and arranged to operate independent of the other of the separate chipset.

4. The apparatus of claim 1, wherein the second integrated circuit corresponds to two separate chipsets, each being connected to the wired communications bus and each configured and arranged both to operate independent of the other of the separate chipset and to operate cooperatively and independent of the wired communications bus.

5. The apparatus of claim 1, wherein the supervisory circuit and the action-responsive circuit being connected to the wired communications bus and each configured and arranged both to operate independent of the other and to operate cooperatively and independent of the wired communications bus.

6. The apparatus of claim 1, wherein the second integrated circuit includes a supervisory circuit configured and arranged to supervise data traffic by monitoring data patterns on the wired communications bus for detecting a suspect illegitimate action and includes an action-responsive circuit configured and arranged to respond to a communication from the supervisory circuit by performing a security action to mitigate the suspect illegitimate action and therein lessen risk ensuing from a malicious access.

7. The apparatus of claim 1, wherein the circuitry of the plurality of integrated circuits includes scan chain circuitry, and wherein the second integrated circuit is further configured and arranged to operate in a mission mode by detecting, via the wired communications bus, one or more special data patterns for legitimately testing aspects of the scan chain circuitry.

8. The apparatus of claim 1, wherein the plurality of integrated circuits includes analog-to-digital conversion circuitry and scan chain circuitry, and wherein the second integrated circuit is further configured and arranged to operate in the mission mode by detecting one or more special data patterns transferred from analog-to-digital conversion circuitry for legitimately testing aspects of the scan chain circuitry.

9. The apparatus of claim 1, further including a memory circuit configured and arranged to be accessed by the second integrated circuit and to store certain data patterns which are known to be associated with or correspond to illegitimate accesses, and wherein the second integrated circuit or another of the plurality of integrated circuits is configured and arranged to self-learn the certain data patterns in response to detected data patterns for which the second integrated circuit performs a security action to mitigate the suspect illegitimate action.

10. The apparatus of claim 1, wherein the plurality of integrated circuits includes scan chain circuitry configured and arranged for scan testing, and wherein the second integrated circuit is further configured and arranged to operate in the mission mode by detecting an illegitimately access to the plurality of integrated circuits by multiple write-type accesses to a common location of circuitry of the same data pattern followed by a read-type access.

11. The apparatus of claim 1, wherein the plurality of integrated circuits includes scan chain circuitry configured and arranged for scan testing, and wherein the second integrated circuit is further configured and arranged to operate in the mission mode by detecting an illegitimately access to the plurality of integrated circuits by multiple write-type accesses to a common location of circuitry of similar data patterns, which are the same except by a difference of one bit, followed by a read-type access.

12. The apparatus of claim 1, wherein the plurality of integrated circuits includes scan chain circuitry configured and arranged for scan testing, and wherein the second integrated circuit is further configured and arranged to operate in the mission mode by detecting an illegitimately access to the plurality of integrated circuits by multiple read-type accesses to a common location of circuitry.

13. The apparatus of claim 1, wherein the plurality of integrated circuits includes scan chain circuitry configured and arranged for scan testing, and wherein the second integrated circuit is further configured and arranged to operate in the mission mode by detecting an illegitimately access to the plurality of integrated circuits by multiple write-type accesses to a common location of circuitry followed by more than two capture cycles in a read-type access.

14. The apparatus of claim 1, wherein the plurality of integrated circuits includes scan chain circuitry configured and arranged for scan testing, and wherein the second integrated circuit is further configured and arranged to operate in the mission mode by detecting an illegitimately access to the plurality of integrated circuits by a write-type access to the scan chain circuitry causing a constant bit of a common polarity to be shifted into the scan chain circuitry.

15. The apparatus of claim 1, wherein the security action corresponds to shutting down operation of the mission mode.

16. The apparatus of claim 1, wherein the security action corresponds to reverting to another previously-authorized secure system mode of operation which includes a subset, corresponding to less than all, of operational aspects enabled during the mission mode.

17. The apparatus of claim 1, wherein the security action corresponds to disabling certain aspects of the plurality of integrated circuits.

18. The apparatus of claim 1, further including a memory circuit configured and arranged to be accessed by the second integrated circuit and to store certain data patterns which are known to be associated with or correspond to illegitimate accesses, wherein the plurality of integrated circuits are further configured and arranged to operate in a controlled circuit-modification mode, and wherein the second integrated circuit or another of the plurality of integrated circuits is configured and arranged to self-learn the certain data patterns by modifying the certain data patterns in response to user-provided instructions indicating acceptance or compliance.

19. An apparatus comprising:
a wired communications bus configured and arranged to carry data; and
a plurality of integrated circuits, each configured and arranged to interface with the wired communications bus, the plurality of integrated circuits including:
a first integrated circuit configured and arranged to operate in a scan mode during which the first integrated circuit performs a scan test to detect one or more faults in circuitry of the plurality of integrated circuits; and
a second integrated circuit configured and arranged to operate in a mission mode during which the second integrated circuit supervises data traffic by monitoring communications including data patterns and accesses on the wired communications bus, detecting a suspect illegitimate data communication, and in response, performing a security action to mitigate a suspect illegitimate action in the plurality of integrated circuits, wherein the plurality of integrated circuits includes digital-to-analog conversion circuitry and scan chain circuitry, and wherein the second integrated circuit is further configured and arranged to operate in the mission mode by detecting one or more special data patterns transferred into digital-to-analog conversion circuitry for legitimately testing aspects of the scan chain circuitry.

20. An apparatus comprising:
a wired communications bus configured and arranged to carry data; and
a plurality of integrated circuits, each configured and arranged to interface with the wired communications bus, the plurality of integrated circuits including:
a first integrated circuit configured and arranged to operate in a scan mode during which the first integrated circuit performs a scan test to detect one or more faults in circuitry of the plurality of integrated circuits; and
a second integrated circuit configured and arranged to operate in a mission mode during which the second integrated circuit supervises data traffic by monitoring communications including data patterns and accesses on the wired communications bus, detecting a suspect illegitimate data communication, and in response, performing a security action to mitigate a suspect illegitimate action in the plurality of integrated circuits, wherein the plurality of integrated circuits includes scan chain circuitry configured and arranged for scan testing, and wherein the second integrated circuit is further configured and arranged to operate in the mission mode by detecting an illegitimately access to the plurality of integrated circuits by multiple write-type accesses to a common location of circuitry of data patterns which correspond to counting of bits of a certain portion of the scan chain circuitry, followed by a read-type access.

* * * * *